United States Patent
Katakura et al.

(10) Patent No.: US 9,056,612 B2
(45) Date of Patent: Jun. 16, 2015

(54) DRIVING FORCE CONTROL DEVICE FOR HYBRID VEHICLE AND DRIVING FORCE CONTROL METHOD FOR HYBRID VEHICLE

(71) Applicant: NISSAN MOTOR CO., LTD., Yokohama-shi, Kanagawa (JP)

(72) Inventors: Shusaku Katakura, Kanagawa (JP); Takamitsu Hase, Kanagawa (JP); Yoshinori Yamamoto, Kanagawa (JP); Kohei Kamiya, Kanagawa (JP); Daigo Kishi, Kanagawa (JP); Kenichiro Murakami, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/385,200

(22) PCT Filed: Mar. 13, 2013

(86) PCT No.: PCT/JP2013/056961
§ 371 (c)(1),
(2) Date: Sep. 15, 2014

(87) PCT Pub. No.: WO2013/137298
PCT Pub. Date: Sep. 19, 2013

(65) Prior Publication Data
US 2015/0057860 A1 Feb. 26, 2015

(30) Foreign Application Priority Data

Mar. 16, 2012 (JP) .................... 2012-060119

(51) Int. Cl.
| | |
|---|---|
| *G01C 21/00* | (2006.01) |
| *G08G 1/123* | (2006.01) |
| *B60W 20/00* | (2006.01) |
| *B60W 10/06* | (2006.01) |
| *B60W 10/08* | (2006.01) |
| *B60W 10/26* | (2006.01) |

(52) U.S. Cl.
CPC .......... *B60W 20/1062* (2013.01); *B60W 10/06* (2013.01); *B60W 10/08* (2013.01); *B60W 10/26* (2013.01); *Y10S 903/93* (2013.01)

(58) Field of Classification Search
CPC ..... B60W 10/08; B60W 10/06; B60W 10/18; B60W 20/00; B60K 6/48; B60K 6/547; B60L 11/14; B60L 11/18; F02D 29/02
USPC ............... 701/22, 83, 84, 70, 490; 340/995.1, 340/995.19; 180/65.1–65.8; 903/930
See application file for complete search history.

(56) References Cited

U.S. PATENT DOCUMENTS

| | | | |
|---|---|---|---|
| 2007/0112475 A1* | 5/2007 | Koebler et al. | 701/1 |
| 2009/0326750 A1* | 12/2009 | Ang | 701/22 |
| 2011/0313647 A1* | 12/2011 | Koebler et al. | 701/123 |

*Primary Examiner* — Muhammad Shafi
(74) *Attorney, Agent, or Firm* — Drinker Biddle & Reath LLP

(57) ABSTRACT

A driving force control device for a hybrid vehicle includes: a travel load calculation unit adapted to divide a predicted route from a current position to a predetermined distance ahead into a plurality of intervals, and to estimate a travel load in each interval; a recommended discharge amount calculation unit adapted to search for a regeneration possible interval, in which a travel condition required by a driver can be maintained even when an output of an internal combustion engine is stopped and regeneration is performed by a motor/generator, from an estimation result, and to estimate a charge amount expected value in the regeneration possible interval, and distributes the charge amount expected value preferentially to an adjacent interval to the regeneration possible interval as a recommended discharge amount in order to stop the output of the internal combustion engine; and an energy management unit that controls an operation of the motor/generator in the current position on the basis of a travel condition, a state of charge, and the recommended discharge amount in the current position.

5 Claims, 18 Drawing Sheets

DRIVING FORCE CONTROL DEVICE FOR HYBRID VEHICLE AND DRIVING FORCE CONTROL METHOD FOR HYBRID VEHICLE

TECHNICAL FIELD

The present invention relates to control of a hybrid vehicle that includes both an internal combustion engine and an electric motor as drive sources.

BACKGROUND ART

In a hybrid vehicle that uses both an internal combustion engine and an electric motor as drive sources, respective operating modes, including travel using the internal combustion engine, travel using the electric motor, and travel using both the internal combustion engine and the electric motor, are set on the basis of operating conditions, a remaining battery capacity, and so on. For example, when the remaining battery capacity is sufficient to enable the vehicle to travel, travel is performed using the electric motor alone. In so doing, a fuel consumption of the internal combustion engine can be reduced, and an exhaust performance can be improved.

To increase opportunities for travel using the electric motor, charging and discharging of the battery must be controlled efficiently. JP2006-306231A, for example, discloses control in which respective outputs of an electric motor and an internal combustion engine are adjusted on the basis of a travel route and a current location of a vehicle, a remaining battery capacity, and an amount of power supplied from the battery to auxiliary devices while traveling along the travel route.

SUMMARY OF INVENTION

In the control disclosed in JP2006-306231A, when the travel route includes an uphill road, for example, control is performed by driving the electric motor on the uphill road to ensure that the remaining battery capacity is consumed entirely by the summit of the uphill road so that regeneration can be performed in a downhill interval. According to this configuration, the internal combustion engine can be stopped while the electric motor is driven on the uphill road. In this case, however, opportunities for stopping the internal combustion engine are increased simply by consuming the remaining battery capacity earlier. In other words, stopping and starting timings of the internal combustion engine are merely altered without reducing an actual switching frequency between stopping and starting. As a result, a frequency with which shock and driver discomfort occur due to repeated stopping and starting of the internal combustion engine during travel cannot be reduced.

An object of the present invention is therefore to provide a control device that reduces the frequency with which shock and driver discomfort occur due to repeated stopping and starting of an internal combustion engine during travel by reducing an actual switching frequency between stopping and starting of the internal combustion engine.

An aspect of the present invention provides a driving force control device for a hybrid vehicle that includes both an internal combustion engine and a motor/generator as drive sources. The driving force control device for a hybrid vehicle includes a travel load calculation unit that divides a predicted route from a current position to a predetermined distance ahead into a plurality of intervals, and estimates a travel load in each interval. The driving force control device also includes a recommended discharge amount calculation unit that searches for a regeneration possible interval, in which a travel condition required by a driver can be maintained even when an output of the internal combustion engine is stopped and regeneration is performed by the motor/generator, from an estimation result obtained by the travel load calculation unit, estimates a charge amount expected value, which is an amount of energy that can be regenerated in the regeneration possible interval, and distributes the charge amount expected value preferentially to an adjacent interval to the regeneration possible interval as a recommended discharge amount in order to stop the output of the internal combustion engine. Furthermore, the driving force control device includes an energy management unit that controls an operation of the motor/generator in the current position on the basis of a travel condition, a state of charge, and the recommended discharge amount in the current position.

Embodiments and advantages of the present invention will be described in detail below with reference to the attached figures.

DESCRIPTION OF EMBODIMENTS

Figure 1:
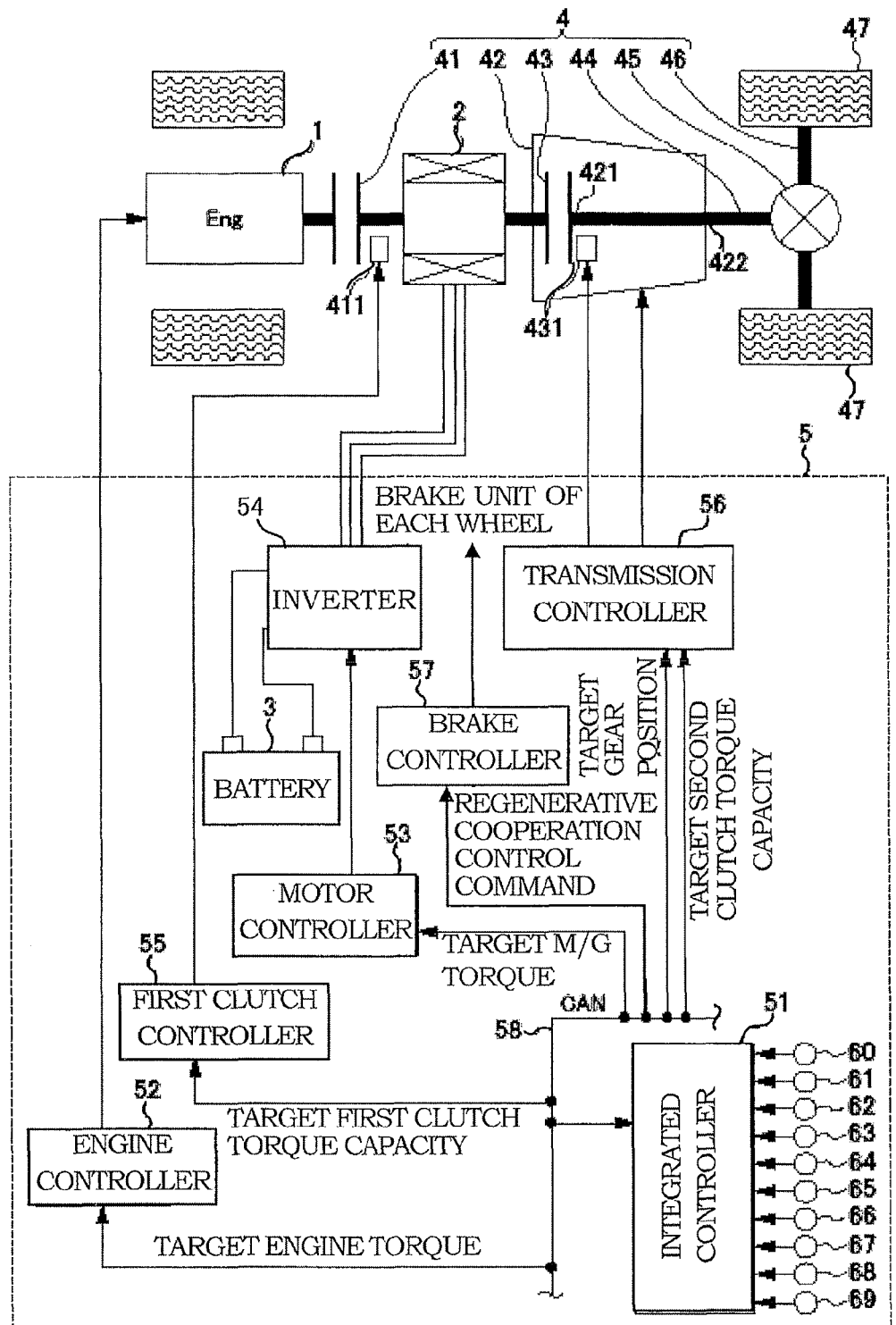
FIG. 1 is a schematic view showing a configuration of a hybrid vehicle according to an embodiment.

FIG. 1 is a schematic view showing a configuration of a front engine rear drive hybrid vehicle (referred to hereafter as an "FR hybrid vehicle) according to an embodiment.

The FR hybrid vehicle includes an internal combustion engine 1 and a motor/generator 2 serving as motive power sources, a battery 3 serving as an electric power source, a drive system 4 constituted by a plurality of components for transmitting output from the power sources to a rear wheel 47, and a control system 5 constituted by a plurality of controllers and so on for controlling components of the internal combustion engine 1, the motor/generator 2, and the drive system 4.

The internal combustion engine 1 is a gasoline engine. A diesel engine may be used instead.

The motor/generator 2 is a synchronous motor/generator formed by burying a per magnet in a rotor and winding a stator coil around a stator. The motor/generator 2 has a function as a motor that is driven to rotate upon reception of a supply of electric power from the battery 3, and a function as a power generator that generates electromotive force in respective ends of the stator coil when the rotor is rotated by an external force.

The battery 3 supplies electric power to various electric components such as the motor/generator 2, and stores power generated by the motor/generator 2.

The drive system 4 of the FR hybrid vehicle includes a first clutch 41, an automatic transmission 42, a second clutch 43, a propeller shaft 44, a final reduction differential device 45, and a drive shaft 46.

The first clutch 41 is provided between the internal combustion engine 1 and the motor/generator 2. The first clutch 41 is a multiplate wet clutch in which a torque capacity can be varied continuously by controlling an oil flow and an oil pressure using a first solenoid valve 411. By varying the torque capacity, the first clutch 41 is controlled to three conditions, namely an engaged condition, a slip condition (a half clutch condition), and a disengaged condition.

The automatic transmission 42 is a stepped transmission having seven forward speeds and one reverse speed. The automatic transmission 42 includes four planetary gear mechanisms, and a plurality of frictional engagement elements (three multiplate clutches, four multiplate brakes, and two one-way clutches) that are connected to a plurality of rotary elements constituting the planetary gear mechanisms in order to modify engagement conditions thereof. By adjusting oil pressure supplied to the respective frictional engagement elements, engagement/disengagement conditions of the respective frictional engagement elements are modified, and as a result, a gear position is switched.

The second clutch 43 is a multiplate wet clutch in which the torque capacity can be varied continuously by controlling the oil flow and the oil pressure using a second solenoid valve 431. By varying the torque capacity, the second clutch 43 is controlled to three conditions, namely the engaged condition, the slip condition (the half clutch condition), and the disengaged condition. In this embodiment, a part of the plurality of frictional engagement elements included in the automatic transmission 42 are diverted for use as the second clutch 43.

The propeller shaft 44 connects an output shaft 422 of the automatic transmission 42 to an input shaft 421 of the final reduction differential device 45.

The final reduction differential device 45 is an integrated device including a final reduction device and a differential device, which is used to decelerate rotation of the propeller shaft 44 and transmit the decelerated rotation to left and right drive shafts 46. Further, when it is necessary to generate a speed difference between respective rotation speeds of the left and right drive shaft 46 during travel on a curve or the like, the final reduction differential device 45 can apply the speed difference automatically so that travel is performed smoothly.

The rear wheel 47 is attached to a tip end of each of the left and right drive wheels 46.

The control system 5 of the FR hybrid vehicle includes an integrated controller 51, an engine controller 52, a motor controller 53, an inverter 54, a first clutch controller 55, a transmission controller 56, and a brake controller 57. The respective controllers are connected to a CAN (Controller Area Network) communication line 58 to be capable of transmitting and receiving data to and from each other through CAN communication.

Detection signals from various sensors for detecting travel conditions of the FR hybrid vehicle, such as an accelerator stroke sensor 60, a vehicle speed sensor 61, an engine rotation sensor 62, a motor/generator rotation sensor 63, a transmission input rotation sensor 64, a transmission output rotation sensor 65, a SOC (State of Charge) sensor 66, a vehicle wheel speed sensor 67, a brake stroke sensor 68, and an acceleration sensor 69, are input into the integrated controller 51.

The accelerator stroke sensor 60 detects a depression amount of an accelerator pedal (referred to hereafter as an "accelerator operation amount"), which indicates a required drive torque of a driver. The vehicle speed sensor 61 detects a travel speed of the FR hybrid vehicle (referred to hereafter as a "vehicle speed"). The engine rotation sensor 62 detects an engine rotation speed. The motor/generator rotation sensor 63 detects a motor/generator rotation speed. The transmission input rotation sensor 64 detects a rotation speed of the input shaft 421 of the automatic transmission 42 (referred to hereafter as a "transmission input rotation speed). The transmission output rotation sensor 65 detects a rotation speed of the output shaft 422 of the automatic transmission 42. The SOC sensor 66 detects a battery storage amount. The vehicle wheel speed sensor 67 detects respective vehicle wheel speeds of four wheels. The brake stroke sensor 68 detects a depression amount of a brake pedal (referred to hereafter as a "brake operation amount"). The acceleration sensor 69 detects a front-rear acceleration of the hybrid vehicle.

The integrated controller 51 manages an overall energy consumption of the FR hybrid vehicle, and to ensure that the FR hybrid vehicle travels at maximum efficiency, the integrated controller 51 calculates control command values to be output to the respective controllers on the basis of the detection signals input from the various sensors. More specifically, the integrated controller 51 calculates a target engine torque, a target motor/generator torque, a target first clutch torque capacity, a target second clutch torque capacity, a target gear position, a regenerative cooperation control command, and so on as the control command values, and outputs the calculated control command values to the respective controllers.

The target engine torque calculated by the integrated controller 51 is input into the engine controller 52 via the CAN communication line 58. The engine controller 52 controls an intake air amount (an opening of a throttle valve) and a fuel injection amount of the internal combustion engine 1 such that an engine torque reaches the target engine torque.

The target motor/generator torque calculated by the integrated controller 51 is input into the motor controller 53 via the CAN communication line 58. The motor controller 53 controls the inverter 54 such that a motor torque reaches the target motor/generator torque.

The inverter 54 is a current converter that performs conversions between two types of electricity, namely a direct current and an alternating current. The inverter 54 converts a direct current from the battery 3 into a three phase alternating current having a desired frequency, and supplies the three phase alternating current to the motor/generator 2 so that the motor torque reaches the target motor/generator torque. When the motor/generator 2 functions as a power generator, on the other hand, the inverter 54 converts a three phase alternating current from the motor/generator 2 into a direct current, and supplies the direct current to the battery 3.

The target first clutch torque capacity calculated by the integrated controller 51 is input into the first clutch controller 55 via the CAN communication line 58. The first clutch controller 55 controls the first solenoid valve 411 such that the torque capacity of the first clutch 41 reaches the target first clutch torque capacity.

The target second clutch torque capacity and the target gear position calculated by the integrated controller 51 are input into the transmission controller 56 via the CAN communication line 58. The transmission controller 56 controls the second solenoid valve 431 such that the torque capacity of the second clutch 43 reaches the target second clutch torque capacity. Further, the transmission controller 56 controls the oil pressure supply to the respective frictional engagement elements of the automatic transmission 42 such that the gear position of the automatic transmission 42 reaches the target gear position.

The regenerative cooperation control command is input into the brake controller 57 from the integrated controller 51. When a required braking force calculated from the brake operation amount during brake pedal depression cannot be satisfied by regenerative braking torque generated by the motor/generator 2 alone, the brake controller 57 implements regenerative cooperation brake control on the basis of the regenerative cooperation control command in order to compensate for the deficiency with frictional braking torque generated by the brake.

Figure 2:
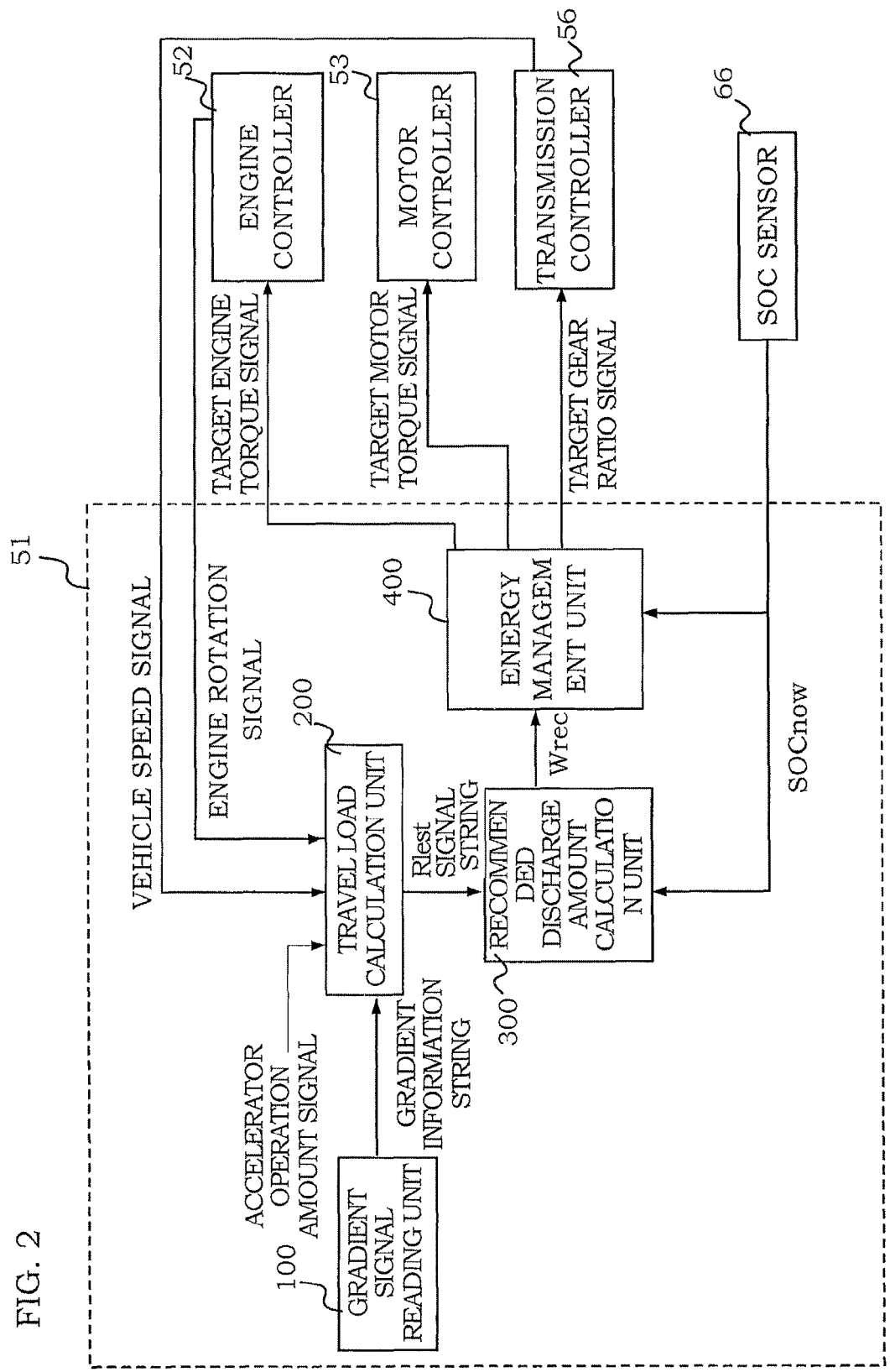
FIG. 2 is a schematic view showing a configuration of a control system.
Figure 3:
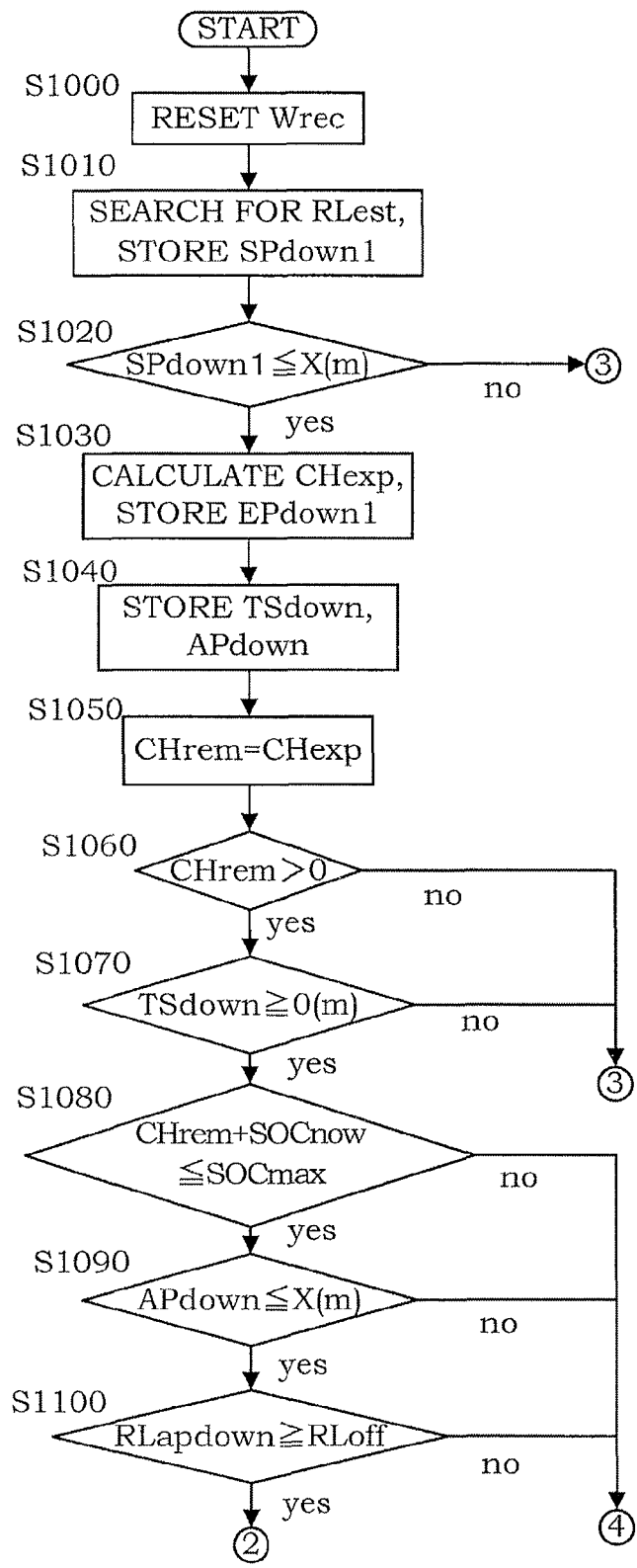
FIG. 3 is a partial flowchart showing calculation content performed by a recommended discharge amount calculation unit.

FIG. 2 is a view showing a configuration of the integrated controller 51, with particular respect to functions relating to this embodiment.

A gradient signal reading unit 100 has a function for dividing a region from a current position to a predetermined distance X (m) ahead in an advancement direction into a plurality of intervals, reading gradient and altitude information from each interval, and setting a measurement point for obtaining distance information indicating a distance to an adjacent interval in each interval. Map information from a navigation system, for example, is used to obtain the position, the gradient, the altitude, and so on.

The predetermined distance X (m) is set as desired. For example, when a destination has been input into the navigation system, an entire distance to the destination may be set. As the predetermined distance X (m) increases, however, a calculation load also increases, leading to a reduction in the precision of predictions obtained through calculations to be described below due to factors such as stoppages at traffic lights, stoppages at intersections, traffic congestion, and so on. Further, in an urban area, stoppages at traffic lights and temporary stoppages at intersections may occur frequently even over a short distance, whereas a distance over which it is possible to travel without stopping increases on suburban roads, expressways, and so on. Hence, the predetermined distance X (m) is preferably set at a distance between approximately several kilometers and several tens of kilometers from a current host vehicle position in accordance with an environment in which the host vehicle is traveling. A distance of each interval is similarly set as desired. The respective intervals may be set at an appropriate distance in consideration of a battery capacity, upper and lower limit values of a battery charge amount, upper and lower limit values of a charge/discharge amount per unit time, a vehicle weight, and a travel resistance, as well as the target vehicle speed, the gradient, and so on, for example. By setting gradient data at equal intervals, for example, within the intervals set at this distance, successive calculations can be performed easily.

When a distance between measurement points is read together with the gradient and altitude information, the inter-measurement point distances may be set at unequal intervals. Here, however, the inter-measurement point distance is set at a predetermined fixed value for ease. Accordingly, the distance of each interval also takes a fixed value.

It should be noted that even when a destination has not been input into the navigation system, a travel route can be predicted approximately several kilometers ahead in the case of an urban area and approximately several tens of kilometers ahead in the case of a suburban road or the like from map information indicating the current travel environment, the advancement direction, and so on. Therefore, this embodiment can be applied even when a destination has not been input.

A travel load calculation unit 200 reads a gradient information string at the measurement point from the gradient signal reading unit 100. Further, the travel load calculation unit 200 reads information relating to vehicle operating conditions required to calculate a travel load, such as a signal indicating the accelerator pedal operation amount by the driver, the vehicle speed, and the engine rotation speed, and information based on characteristics of the vehicle, such as the vehicle weight and travel resistance information. The travel load calculation unit 200 then calculates a load of a power train between respective measurement points on the basis of this information, and transmits resulting calculation data to a recommended discharge amount calculation unit 300 in the form of a travel load estimated value signal string.

The recommended discharge amount calculation unit 300 calculates and stores a recommended discharge amount in the current travel interval from the travel load estimated value signal string, and transmits a calculation result to an energy management unit 400.

The energy management unit 400 distributes the target torque between engine control and motor control within the hybrid system in order to minimize an amount of energy required to realize a required travel load determined from a driver requirement, and transmits a target gear ratio to the transmission controller 56. Further, the energy management unit 400 switches the motor/generator 2 between driving and power generation on the basis of the current SOC and so on. The recommended discharge amount is reflected in an index used during the switch so that discharge and regeneration are performed in anticipation of the gradient.

Next, calculation content performed by the recommended discharge amount calculation unit 300 will be described specifically.

FIGS. 3 to 7 are flowcharts showing the calculation content performed by the recommended discharge amount calculation unit 300. These calculations are executed while the vehicle is in motion every time the current vehicle position reaches the next measurement point such that the gradient signal string is updated.

In the following description, it is assumed that the travel load and amounts of an identical dimension are negative in a charging direction and positive in a discharging direction. In all other conditions, the recommended discharge amount of the current position is maintained.

In a step S1000, the recommended discharge amount calculation unit 300 resets a signal string of a recommended discharge amount Wrec as a preparatory operation. In other words, the recommended discharge amount Wrec is set at zero from a 0 (m) location, i.e. the current position, to a furthest X (m) location.

In a step S1010, the recommended discharge amount calculation unit 300 determines a start point of a nearest regeneration possible interval group by searching for a signal string of a travel load estimated value RLest. A regeneration possible interval is an interval located before the X (m) location, in which the travel load estimated value RLest is equal to or smaller than a load (referred to hereafter as an accelerator OFF expected load) at which the driver can be expected to switch the accelerator OFF. The measurement point of an interval that satisfies these conditions is stored as a descent 1 start point SPdown1.

In a step S1020, the recommended discharge amount calculation unit 300 determines whether or not the descent 1 start point SPdown is further away than the X (m) location. When the descent 1 start point SPdown is further away, it is determined that a regeneration possible interval does not exist within a search range. Accordingly, the value in the 0 (m) location is read from the reset recommended discharge amount signal string in a step S1210 of FIG. 5, and the read value is set as a recommended discharge amount final value Wrecfv.

When the descent 1 start point SPdown is closer than the X (m) location, on the other hand, processing of a step S1030 is executed.

In the step S1030, the recommended discharge amount calculation unit 300 searches for a travel load estimation signal string in continuation from the step S1010 in order to determine an end point of the nearest regeneration possible interval group. Simultaneously, the recommended discharge amount calculation unit 300 determines a charge amount expected value CHexp at the corresponding location from the travel load, a charging efficiency, and a transmission efficiency of the power train (referred to hereafter as a PT transmission efficiency) in the corresponding location, and adds the result to the charge amount expected value. Furthermore, similarly to the step S1010, the recommended discharge amount calculation unit 300 stores the end point of the nearest regeneration possible interval group as a descent 1 end point EPdown1.

In a step S1040, the recommended discharge amount calculation unit 300 stores a point immediately preceding the descent 1 start point SPdown1 as a pre-descent search point TSdown, and stores a point immediately following the descent 1 end point EPdown1 as a post-descent search point APdown. Load evaluation and distribution of the recommended discharge amount Wrec are performed thereafter on the basis of these points.

In a step S1050, the recommended discharge amount calculation unit 300 stores the charge amount expected value CHexp determined in the step S1030 as a residual charge CHrem.

In a step S1060, the recommended discharge amount calculation unit 300 determines whether or not the residual charge CHrem is larger than zero. When the residual charge CHrem is larger than zero, processing of a step S1070 is executed.

When the residual charge CHrem is smaller than zero, it is determined that the charge amount expected value CHexp has been distributed among the respective intervals as a discharge amount. Accordingly, the value of the 0 (m) location is read in the step S1210 of FIG. 5 and set as the recommended discharge amount final value Wrecfv.

Figure 5:
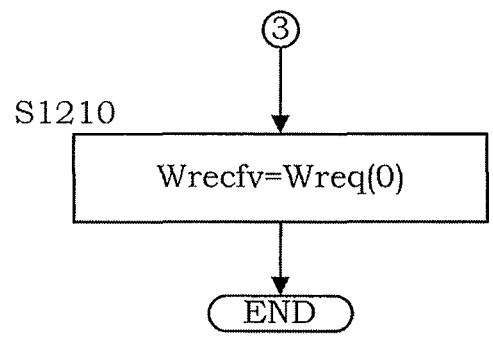
FIG. 5 is a partial flowchart showing the calculation content performed by the recommended discharge amount calculation unit.

In the step S1070, the recommended discharge amount calculation unit 300 determines whether or not the pre-descent search point TSdown is before the 0 (m) location. When the pre-descent search point TSdown is before the 0 (m) location, it is determined that the search is complete, and the processing of the step S1210 in FIG. 5 is executed. When the pre-descent search point TSdown is not before the 0 (m) location, processing of a step S1080 is executed.

The two steps S1060 and S1070 described above are conditions for terminating the calculations of the recommended discharge amount calculation unit 300. The following steps S1080 to S1100 are determinations made when an interval before the regeneration possible interval group is to be prioritized as a distribution destination of the charge amount expected value CHexp or when an interval following the regeneration possible interval group is not selectable.

In the step S1080, the recommended discharge amount calculation unit 300 determines whether or not a sum of the residual charge CHrem and a current SOC (SOCnow) is equal to or smaller than an SOC upper limit value (SOCmax). When the sum is equal to or smaller than SOCmax, processing of a step S1090 is executed. When the sum is larger than SOCmax, this means that the interval before the regeneration possible interval group is to be prioritized, and therefore processing of a step S1220 in FIG. 6, to be described below, is executed.

In the step S1090, the recommended discharge amount calculation unit 300 determines whether or not the post-descent search point APdown is before X (m). When the post-descent search point APdown is before X (m), processing of the step S1100 is executed. When the post-descent search point APdown is further away than X (m), this means that the search interval has not reached the end point of the regeneration possible interval, and it is therefore determined that the interval following the regeneration possible interval group is not selectable. Accordingly, the processing of the step S1220 in FIG. 6 is executed.

Figure 4:
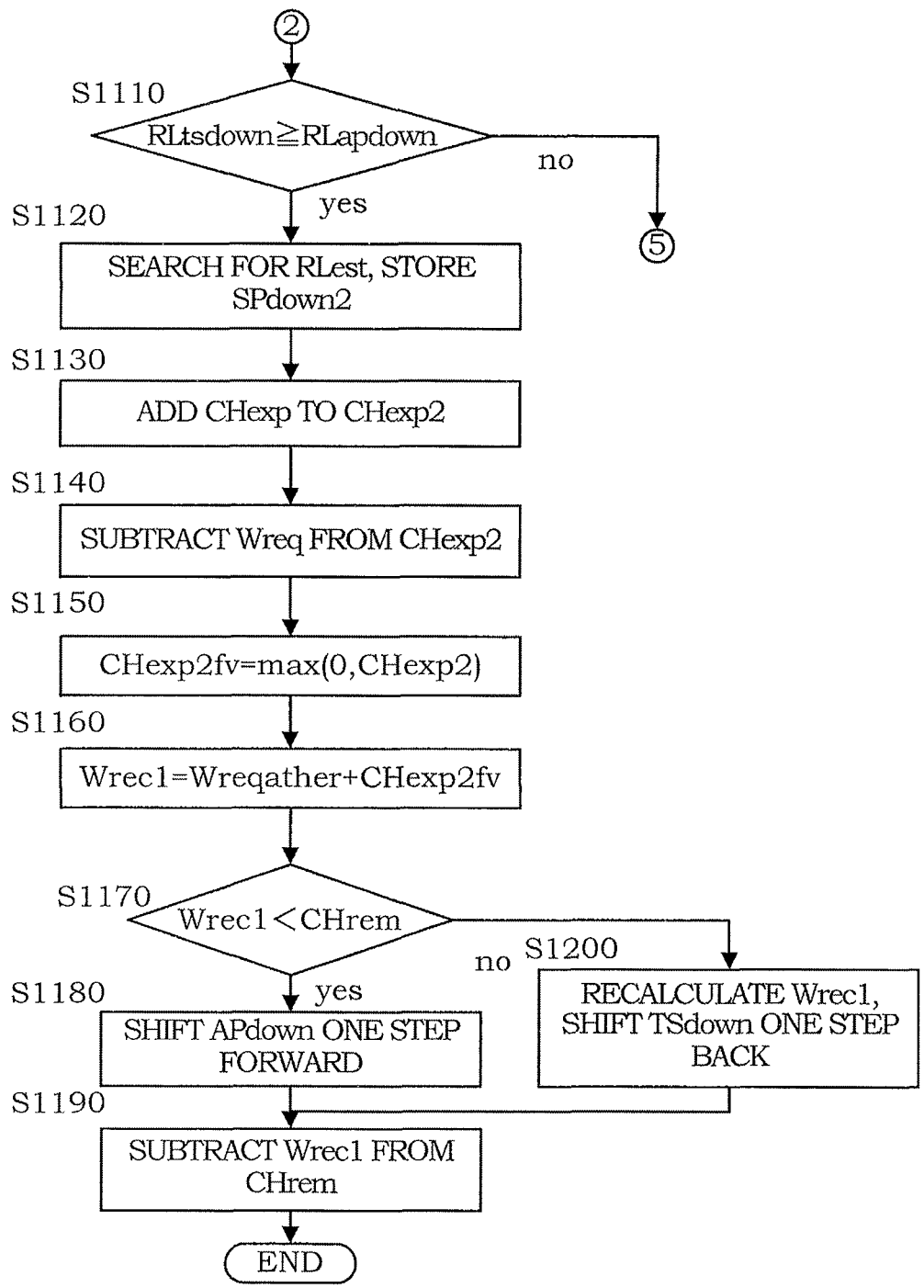
FIG. 4 is a partial flowchart showing the calculation content performed by the recommended discharge amount calculation unit.

In the step S1100, the recommended discharge amount calculation unit 300 determines whether or not a travel load RLapdown at the post-descent search point APdown is equal to or greater than an accelerator OFF expected load RLoff. When the travel load RLapdown is equal to or greater than the accelerator OFF expected load RLoff, processing of a step S1110 in FIG. 4 is executed. When the travel load RLapdown is smaller than the accelerator OFF expected load RLoff, it is determined that discharging is not to be performed, and accordingly, the processing of the step S1220 in FIG. 6 is executed.

Figure 6:
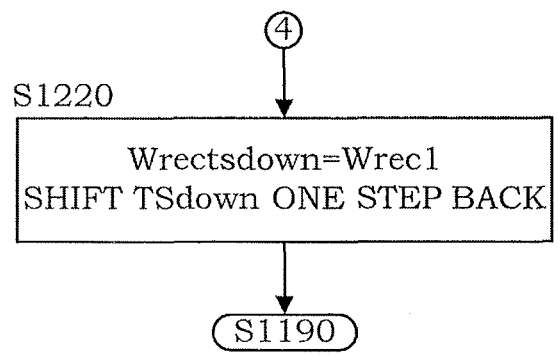
FIG. 6 is a partial flowchart showing the calculation content performed by the recommended discharge amount calculation unit.

In the step S1220 of FIG. 6, the recommended discharge amount calculation unit 300 determines the recommended discharge amount from the travel load, the discharge efficiency, and the PT transmission efficiency at the pre-descent search point TSdown, and sets the result as a recommended discharge amount 1 (Wrec1) at the pre-descent search point TSdown. Further, the recommended discharge amount calculation unit 300 shifts the pre-descent search point TSdown one step back.

Figure 7:
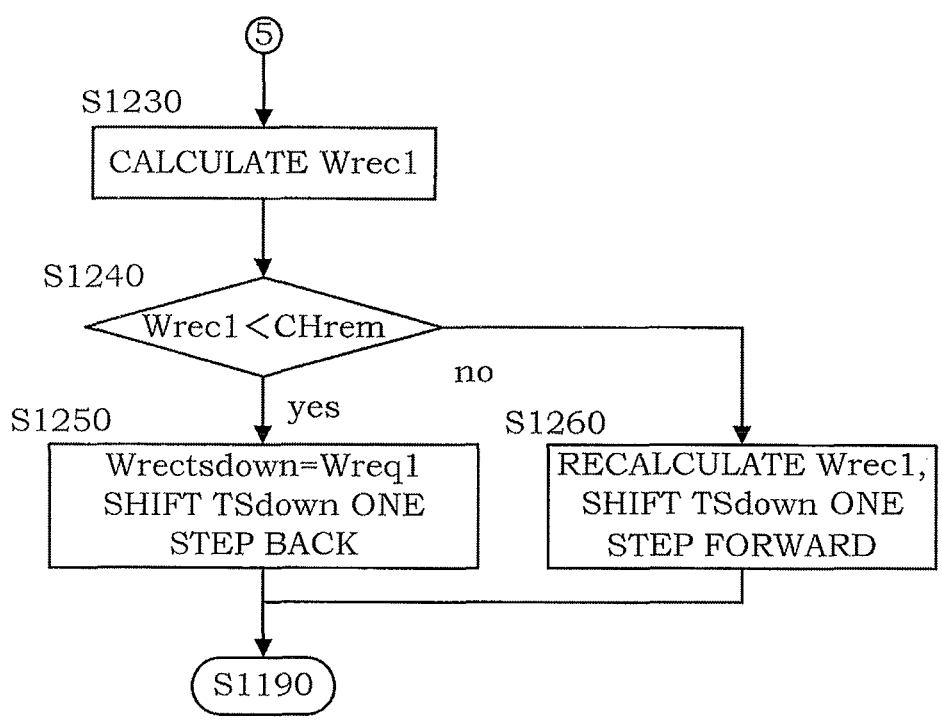
FIG. 7 is a partial flowchart showing the calculation content performed by the recommended discharge amount calculation unit.

Except in a case in which the interval following the regeneration possible interval group is not selected in accordance with the determinations of the steps S1080 to S1100, from the step S1110 onward, the recommended discharge amount calculation unit 300 selects a discharge interval by comparing the travel loads before and after the regeneration possible interval group. Hence, when a travel load RLtsdown at the pre-descent search point TSdown is smaller than the travel load RLapdown at the post-descent search point APdown in the step S1110, processing of a step S1230 in FIG. 7 is executed.

In the step S1230, the recommended discharge amount calculation unit 300 determines the recommended discharge amount 1 (Wrec1) on the basis of the travel load RLtsdown, the discharge efficiency, and the PT transmission efficiency at the pre-descent search point TSdown.

Next, in a step S1240, the recommended discharge amount calculation unit 300 compares the recommended discharge amount 1 (Wrec1) with the residual charge CHrem. When the recommended discharge amount 1 (Wrec1) is smaller than the residual charge CHrem, processing of a step S1250 is executed.

In the step S1250, the recommended discharge amount calculation unit 300 determines that the internal combustion engine 1 can be stopped from the determination result obtained in the step S1240, and accordingly sets a recommended discharge amount Wrectsdown at the pre-descent search point TSdown as the recommended discharge amount 1 (Wrec1) and shifts the pre-descent search point TSdown one step back.

When the determination of the step S1240 indicates that the recommended discharge amount 1 (Wrec1) is larger than the residual charge CHrem, on the other hand, processing of a step S1260 is executed.

In the step S1260, the recommended discharge amount calculation unit 300 deter mines that the internal combustion engine 1 cannot be stopped, and accordingly prioritizes distribution to the larger load, or in other words the interval following the regeneration possible interval group. The recommended discharge amount Wrec1 is then determined anew on the basis of the travel load RLapdown, the discharge efficiency, and the PT transmission efficiency at the post-descent search point APdown. Further, the post-descent search point APdown is shifted one step forward. Here, the interval following the regeneration possible interval group is not ultimately related to the current recommended discharge amount, and it is not therefore necessary to store the recommended discharge amount. When, for some reason, it is necessary to store the recommended discharge amount, however, the recommended discharge amount at the post-descent search point APdown may be set as the recommended discharge amount 1 (Wrec1).

Having determined to prioritize the interval following the regeneration possible interval group in the steps S1080 to S1100, the recommended discharge amount calculation unit 300 starts to search for a travel load estimated value signal string in a step S1120 using the post-descent search point APdown as a start point. After finding a measurement point at which the travel load estimated value RLest is smaller than the accelerator OFF expected load RLoff, the recommended discharge amount calculation unit 300 determines that a second regeneration possible interval starts from the found measurement point, and stores a corresponding position as a descent 2 start point SPdown2.

After determining in the step S1120 that the second regeneration possible interval exists, the recommended discharge amount calculation unit 300 searches for a travel load estimated value signal string in continuation from the step S1120 in a step S1130 in order to find the end point of the second regeneration possible interval group. At the same time, the recommended discharge amount calculation unit 300 determines the charge amount expected value CHexp on the basis of the travel load, the discharge efficiency, and the PT transmission efficiency at each location, and adds resulting values to a charge amount expected value 2 (CHexp2).

In a step S1140, the recommended discharge amount calculation unit 300 searches an interval extending from a point TSdown2 one before the descent 2 start point to the post-descent search point APdown1, deter mines the required discharge amount Wreq at each location on the basis of the travel load, the discharge efficiency, and the PT transmission efficiency at each location, and subtracts resulting values from the charge amount expected value 2 (CHexp2).

In a step S1150, the recommended discharge amount calculation unit 300 compares the charge amount expected value 2 (CHexp2) with zero to determine whether or not a charge amount to be distributed to the post-descent search point remains in the charge amount expected value CHexp2 of the second regeneration possible interval group, and sets the larger of the two values as a charge amount expected value 2 final value CHexp2fv.

When the part to be distributed to the post-descent search point remains such that charging can be performed on a following descent, the part to be distributed is preferably subtracted and distributed during distribution to the post-descent search point from the charge amount expected value at the nearest regeneration possible interval group. In so doing, the charge amount can be distributed to a greater number of intervals, with the result that the internal combustion engine 1 can be stopped more continuously.

Hence, in a step S1160, the recommended discharge amount calculation unit 300 determines a required discharge amount Wreqather at each location on the basis of the travel load, the discharge efficiency, and the PT transmission efficiency at the post-descent search point, and sets the recommended discharge amount 1 (Wrec1) by adding a resulting value to the charge amount expected value 2 final value CHexp2fv of the step S1150.

In a step S1170, similarly to the step S1240, the recommended discharge amount calculation unit 300 compares the recommended discharge amount 1 (Wrec1) with the residual charge CHrem. When the recommended discharge amount 1 (Wrec1) is smaller, it is determined that the internal combustion engine 1 can be stopped, and therefore, in a step S1180, the post-descent search point is shifted one step back. At this time, similarly to the step S1260, there is no need to store the recommended discharge amount Wrec.

Having determined that the recommended discharge amount 1 (Wrec1) is larger, it is determined that the internal combustion engine 1 cannot be stopped, and therefore distribution to the larger load, which in this case is the interval before the regeneration possible interval group, is prioritized. Accordingly, in a step S1200, the recommended discharge amount 1 (Wrec1) is determined anew on the basis of the travel load, the discharge efficiency, and the PT transmission efficiency at the pre-descent search point, and a resulting value is set as the recommended discharge amount of the pre-descent search point. The pre-descent search point is then shifted one step back.

In a step S1190, the recommended discharge amount calculation unit 300 subtracts the recommended discharge amount 1 (Wrec1) determined in the steps S1220, S1230, S1260, S1160, and S1200 from the residual charge CHrem.

This processing is continued until it is determined in the step S1060 that the expected charge amount has been distributed to the respective intervals as the discharge amount, or until it is determined in the step S1070 that the search is complete. As a result, finally, in a step S1210, the recommended discharge amount final value Wrecfv is set as the recommended discharge amount of the current location.

The calculations described above can be summarized as follows.

The travel load, the regeneration possible interval group, and the charge amount expected value CHexp in the regeneration possible interval group from the current position to a predetermined interval ahead are estimated, and the charge amount expected value CHexp is allocated to the intervals before and after the regeneration possible group as the recommended discharge amount Wrec. In so doing, opportunities for stopping the internal combustion engine 1 continuously and traveling using the motor/generator 2 increase.

Allocation of the recommended discharge amount Wrec is performed repeatedly by subtracting the allocated recommended discharge amount Wrec from the charge amount expected value CHexp every time allocation is performed to one interval until the charge amount expected value CHexp reaches zero.

When the charge amount expected value CHexp is allocated to the interval following the regeneration possible interval group, an interval immediately after this interval is selected as the next allocation destination. When the charge amount expected value CHexp is allocated to the interval before the regeneration possible interval group, on the other hand, an interval immediately before this interval is selected as the next allocation destination.

When it is estimated from the charge amount expected value CHexp and the current SOC that the SOC upper limit value will be reached after traveling through the nearest regeneration possible interval group, allocation to the interval before the regeneration possible interval group is prioritized to ensure that the SOC upper limit value is not reached.

When, after comparing the charge amount expected value CHexp with the travel load estimated values of the intervals before and after the regeneration possible interval group, it is determined that the internal combustion engine 1 cannot be stopped by allocating the recommended discharge amount Wrec to either interval, allocation of the recommended discharge amount Wrec to the interval having the larger travel load is prioritized. When, on the other hand, it is determined that the internal combustion engine 1 can be stopped by allocating the recommended discharge amount Wrec to either interval, allocation of the recommended discharge amount Wrec to the interval having the smaller travel load is prioritized.

Further, when, as a result of prioritizing allocation to the interval having the smaller travel load, the interval following the nearest regeneration possible interval group is selected, the next regeneration possible interval group ahead is searched for, and if such a group exists, the charge amount expected value CHexp in this interval group is estimated. The travel loads of the following regeneration possible interval group are then subtracted in sequence from this charge amount expected value CHexp. When a part of the charge amount expected value remains thereafter, the recommended discharge amount Wrec of the interval following the nearest regeneration possible interval group is calculated on the basis of the remainder, the charge amount expected value CHexp of the nearest regeneration possible interval group, and the travel resistance of the interval following the nearest regeneration possible interval group.

Figure 8:
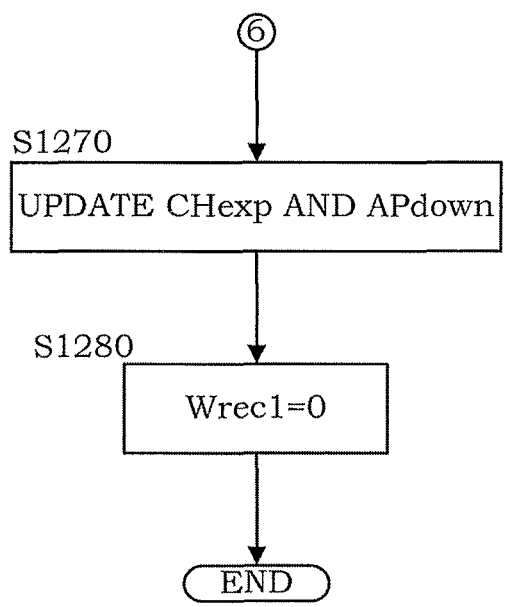
FIG. 8 is a partial flowchart showing another example of the calculation content performed by the recommended discharge amount calculation unit.

It should be noted that in the step S1100, when the travel load RLapdown of the post-descent search point is smaller than the accelerator OFF expected load RLoff, or in other words in an interval where regenerative charging can be expected, processing of a step S1270 in FIG. 8 may be executed in addition to the processing of the step S1220.

In the step S1270, the recommended discharge amount calculation unit 300 updates the charge amount expected value CHexp and the post-descent search point APdown until the travel load RLapdown of the post-descent search point becomes greater than the accelerator OFF expected load RLoff, or in other words until regenerative charging can no longer be expected.

To ensure that the residual charge expected value CHreq is not updated in the following steps, the recommended discharge amount calculation unit 300 sets the estimated discharge amount 1 (Wrec1) at zero in a step S1280, and then executes the processing of the step S1190.

In so doing, when a continuous descent exists in the search interval, travel using the motor can be expected along the continuous descent.

Next, a case in which the above calculations are executed will be described citing specific examples. Here, eight measurement points, including the current position, are set in relation to the predetermined distance X (m) such that distribution is performed to seven intervals. This is merely an example, however, and the number of measurement points may be determined in accordance with the state of charge of the battery 3, the power generation amount of the motor/generator 2, the precision of the position information, and so on.

FIGS. 9 to 19 show operations performed when executing the calculations described above in time series, on which the abscissa shows distance. Each figure shows a condition in which the current vehicle position corresponds to a measurement point at which the gradient information is set. In this location, a travel load information string of a range defined by a travel load information search range is searched for, and the recommended discharge amount final value is determined. The travel load information search range is a range of the charge amount expected value and the recommended discharge amount, which is surrounded by dotted lines on the charts. The travel load information string will be described below.

On a road shape chart, an up-down direction indicates the altitude, and circles displayed at fixed intervals indicate the measurement points.

A travel load chart shows the travel load between the respective measurement points, wherein variation in the up-down direction of the road shape is read as the gradient, and the travel conditions and vehicle characteristics are taken into consideration. The travel load information string is obtained by gathering together the data on this chart as a data string for each interval of the travel load information search range.

The charge amount expected value and the recommended discharge amount are obtained by applying the results of the calculations to a current travel pattern within the travel load information search range.

A SOC chart shows the state of charge of the battery 3, and a center line on the chart shows a reference value used in a case where regenerative charging and discharge according to the calculations are not performed (referred to hereafter as a normal travel condition). In the normal travel condition, the integrated controller 51 executes charge/discharge control such that the SOC is maintained at the reference value.

A fuel use chart shows the fuel injection amount in a corresponding interval, and a lower line shows a fuel injection amount of zero, or in other words a condition in which the internal combustion engine 1 is stopped. Dotted lines on this chart show the fuel injection amount in a case where a fuel cut is not performed.

In the following description, the measurement points are set as P0, P1, P2, ..., and the intervals are set as a first interval, a second interval, ..., a seventh interval in the advancement direction within each travel load information search range.

Figure 9:
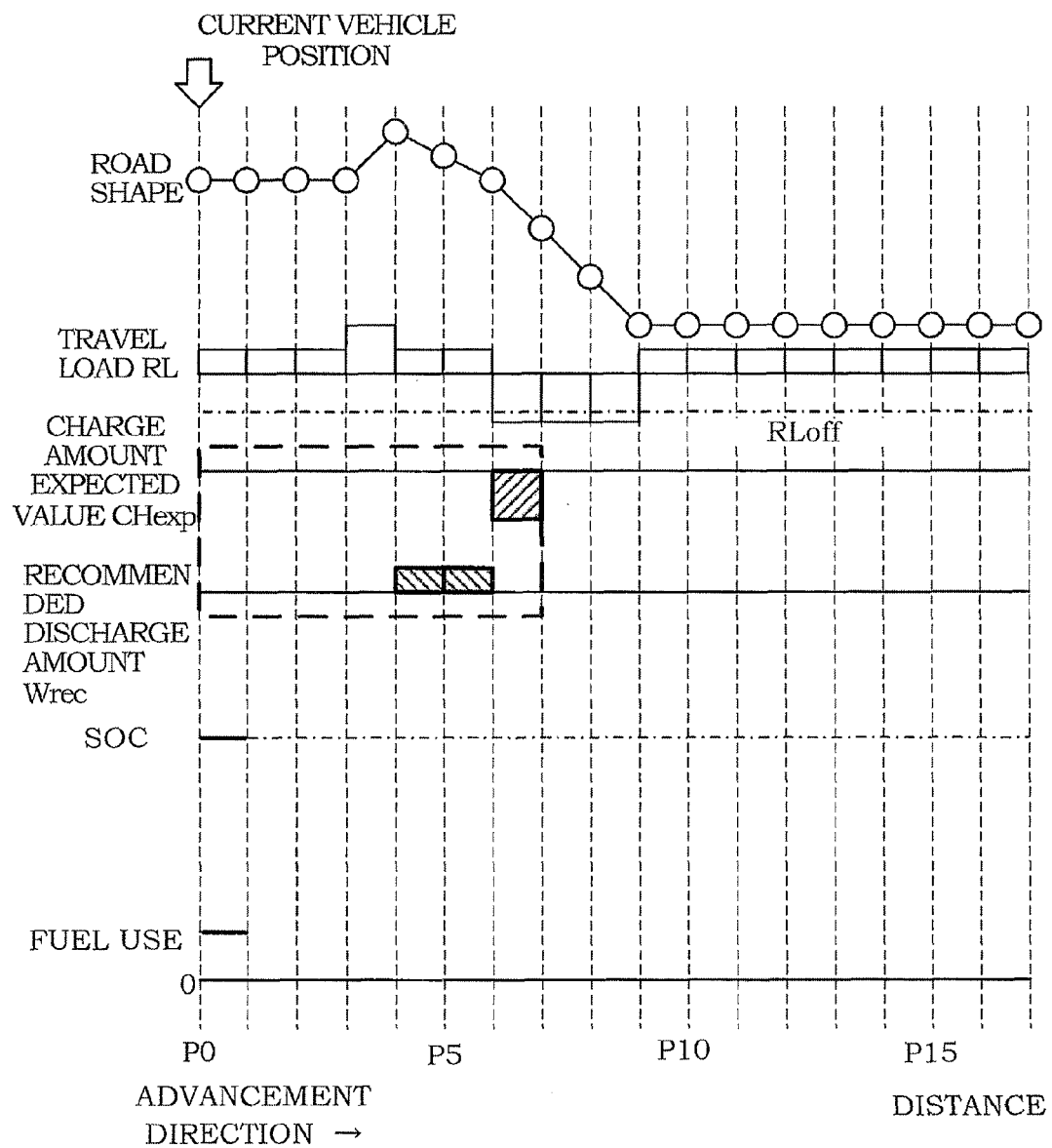
FIG. 9 is a first view showing in time series operations performed when the calculations of FIGS. 3 to 8 are executed.

In FIG. 9, the current position is P0 such that the travel load information search range extends from P0 to P7. Only the seventh interval corresponds to an interval in which the travel load is smaller than the accelerator OFF expected load, or in other words the regeneration possible interval group. Hence, when the charge amount expected value in the seventh interval is calculated and allocated preferentially to the adjacent regeneration possible interval group such that the travel load reaches zero, the charge amount expected value is allocated to the fifth interval and the sixth interval. As a result, the recommended discharge amount in the first interval is zero, and therefore discharge is not performed, the SOC does not vary, and the fuel injection amount does not reach zero.

Figure 10:
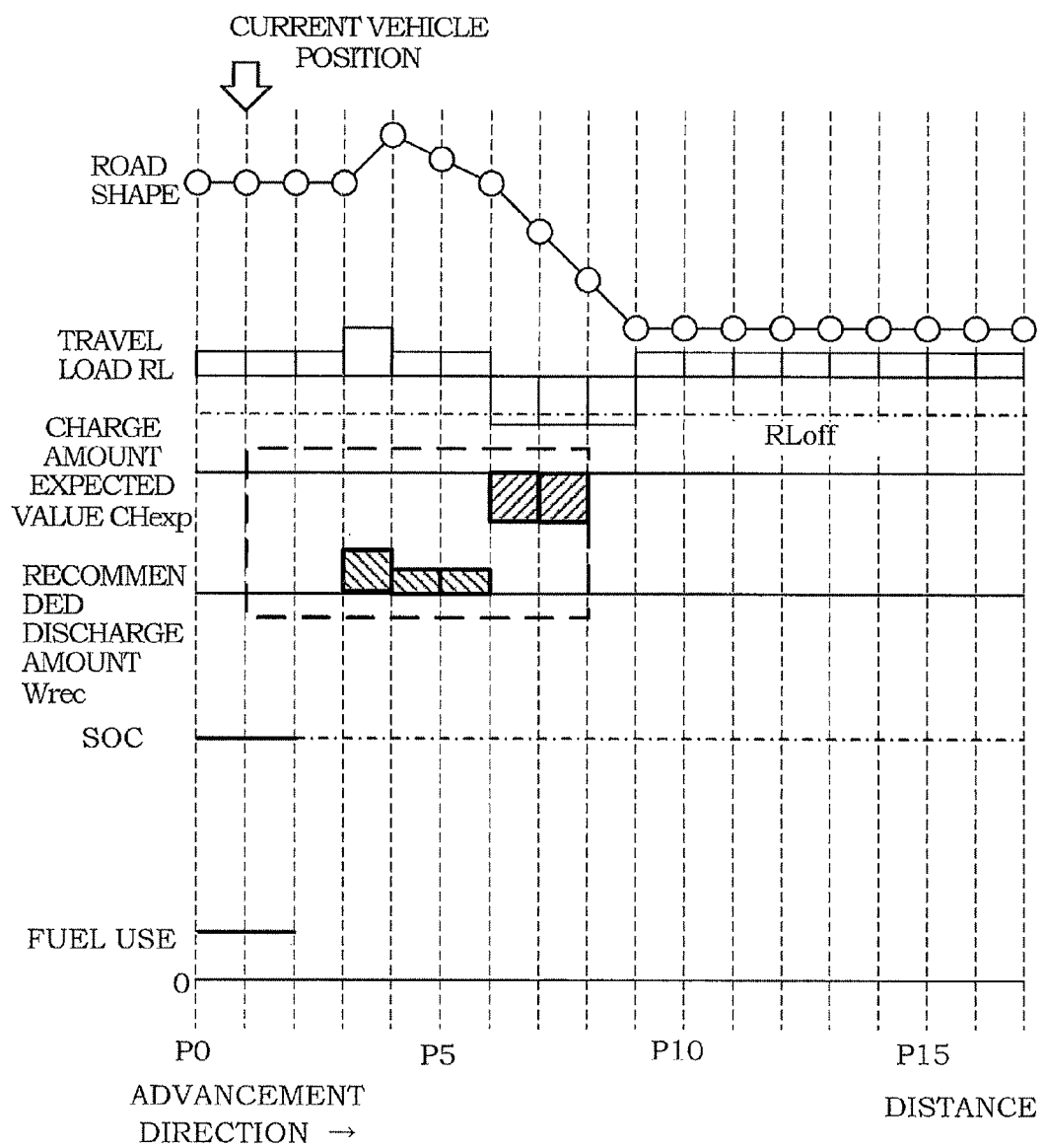
FIG. 10 is a first view showing in time series the operations performed when the calculations of FIGS. 3 to 8 are executed.

In FIG. 10, the vehicle position advances one step from FIG. 9 to P1, and the travel load information search range is shifted one step so as to extend from P1 to P8. The regeneration possible interval group includes the sixth interval and the seventh interval, and similarly to FIG. 9, when the recommended discharge amount is allocated, the recommended discharge amount is allocated from the third interval to the fifth interval. As a result, the recommended discharge amount reaches zero in the first interval, which includes the current vehicle position, and since the recommended discharge amount is zero, discharge is not performed, the SOC does not vary, and the fuel injection amount does not reach zero.

Figure 11:
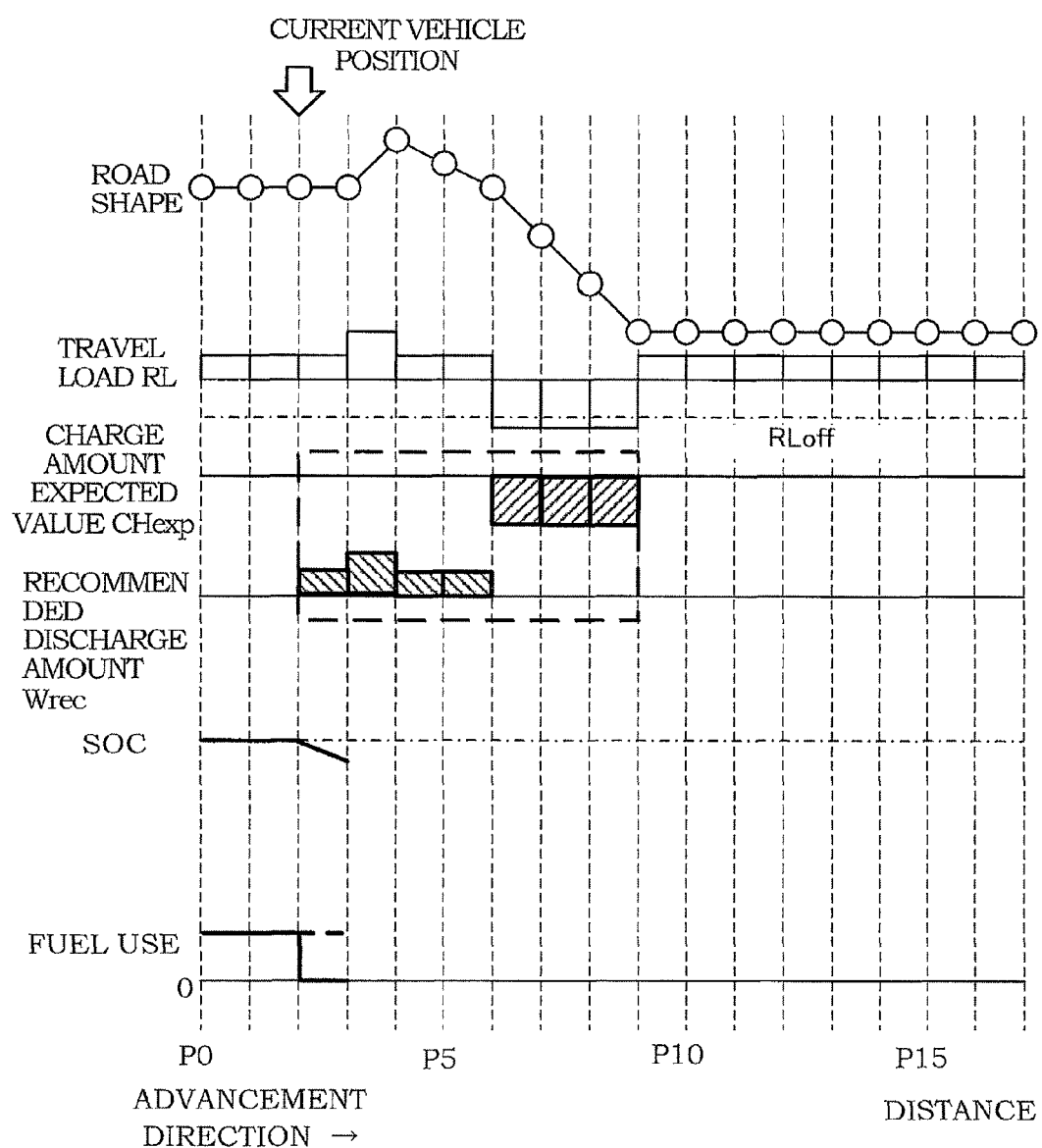
FIG. 11 is a second view showing in time series the operations performed when the calculations of FIGS. 3 to 8 are executed.

In FIG. 11, the current vehicle position advances one step from FIG. 10 to P2, and the travel load information search range is also shifted one step so as to extend from P2 to P9. The regeneration possible interval group extends from the fifth interval to the seventh interval. The recommended discharge amount is allocated to the first to fourth intervals. By setting the recommended discharge amount in the first interval, discharge is performed in the first interval such that the SOC decreases. Further, as a result of the discharge, the motor/generator 2 is driven and the internal combustion engine 1 is stopped, and therefore the fuel injection amount reaches zero.

Figure 12:
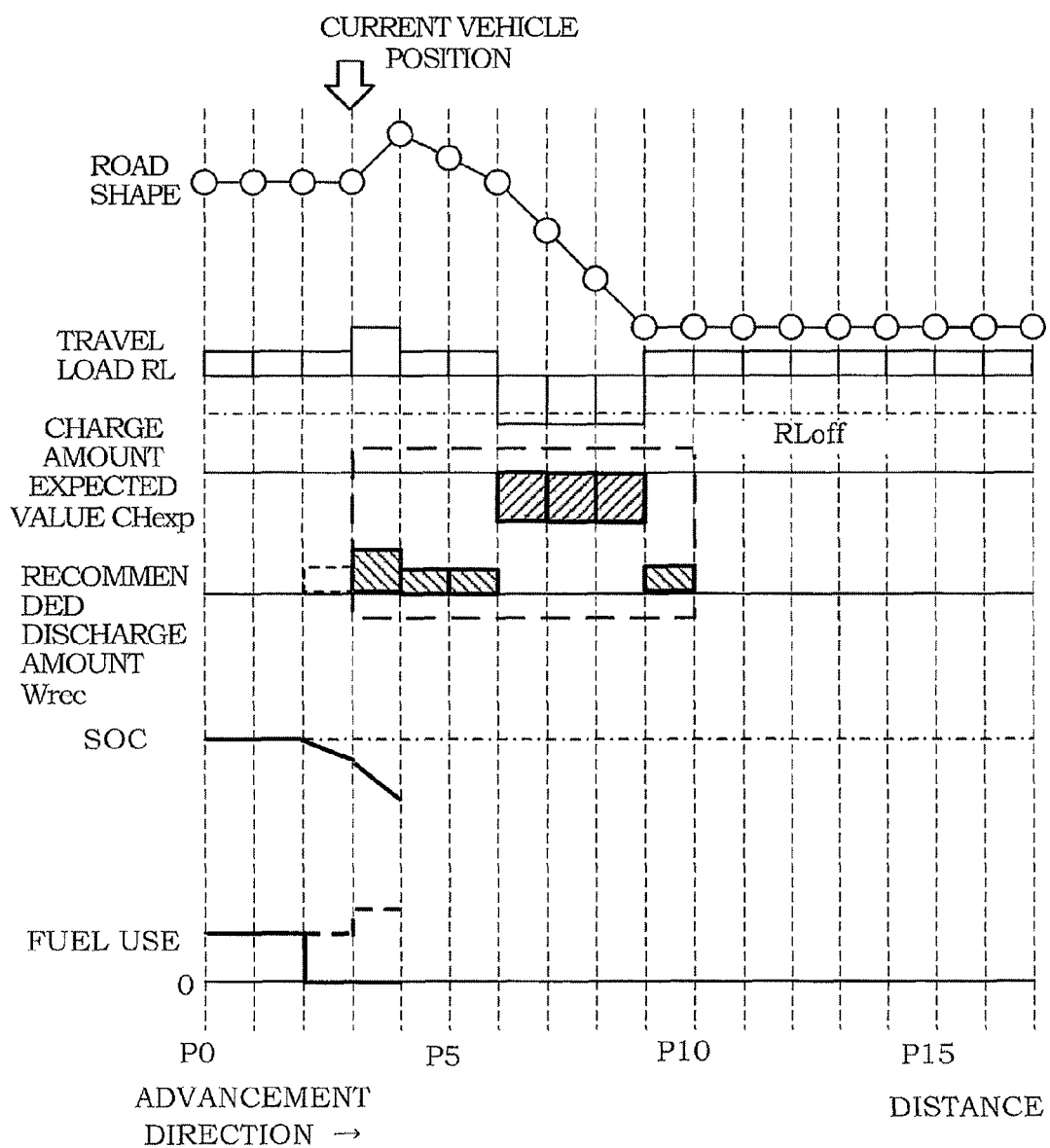
FIG. 12 is a third view showing in time series the operations performed when the calculations of FIGS. 3 to 8 are executed.

In FIG. 12, the current vehicle position advances one step from FIG. 11 to P3, and the travel load information search range extends from P3 to P10. The regeneration possible interval group extends from the fourth interval to the sixth interval, and the recommended discharge amount is allocated to the first to third intervals. By setting the recommended discharge amount in the first interval, similarly to FIG. 11, the SOC decreases and the fuel injection amount reaches zero.

Figure 13:
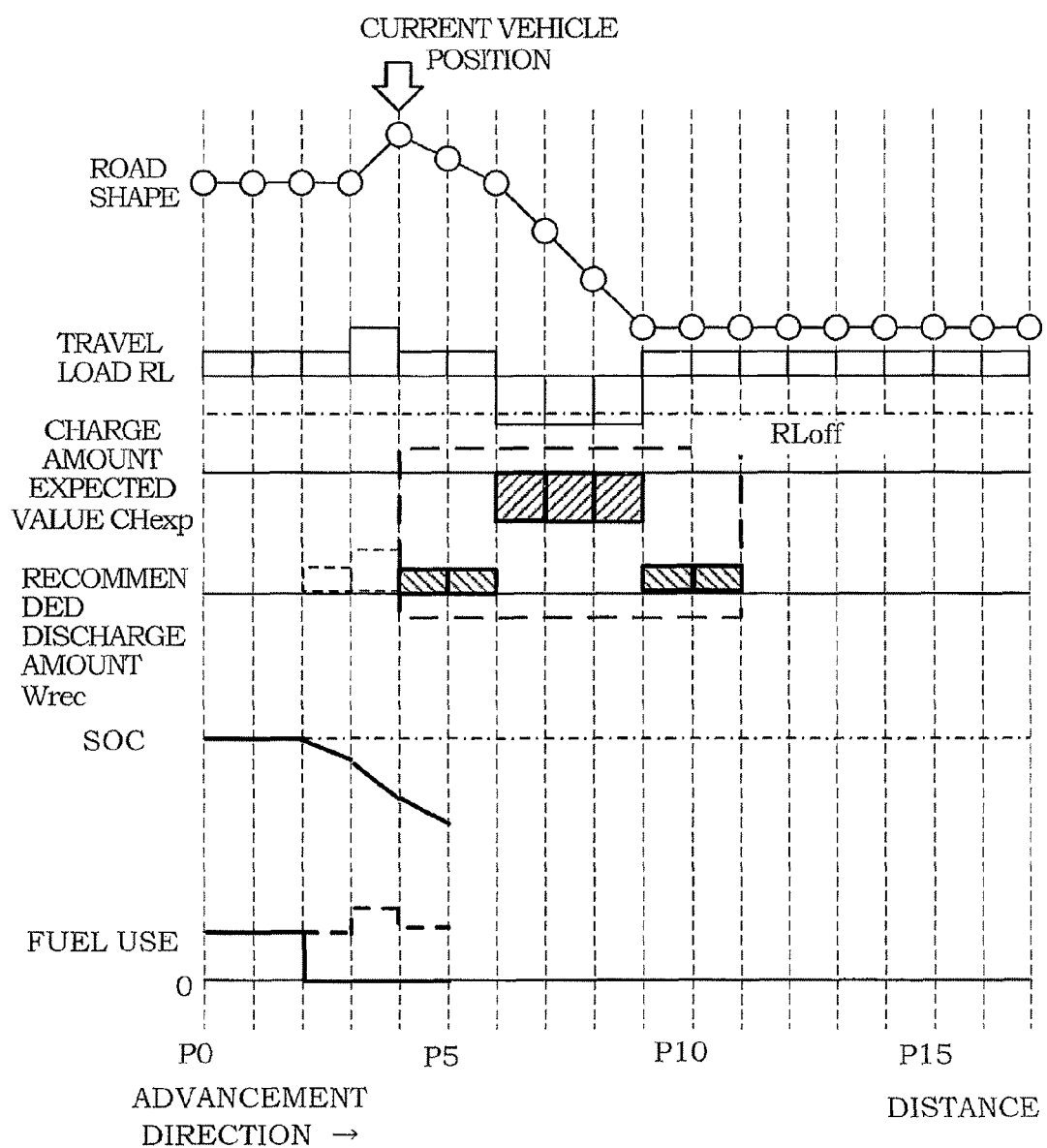
FIG. 13 is a fourth view showing in time series the operations performed when the calculations of FIGS. 3 to 8 are executed.

In FIG. 13, the current vehicle position advances one step from FIG. 12 to P4, and the travel load infix illation search range extends from P4 to P11. The regeneration possible interval group extends from the third interval to the fifth interval, and the recommended discharge amount is first allocated to the first and second intervals. As a result, the SOC decreases and the fuel injection amount reaches zero in the first interval. Furthermore, after the recommended discharge amount is allocated, a part of the charge amount expected value remains, and therefore the recommended discharge amount is also set in the sixth interval and the seventh interval.

Figure 14:
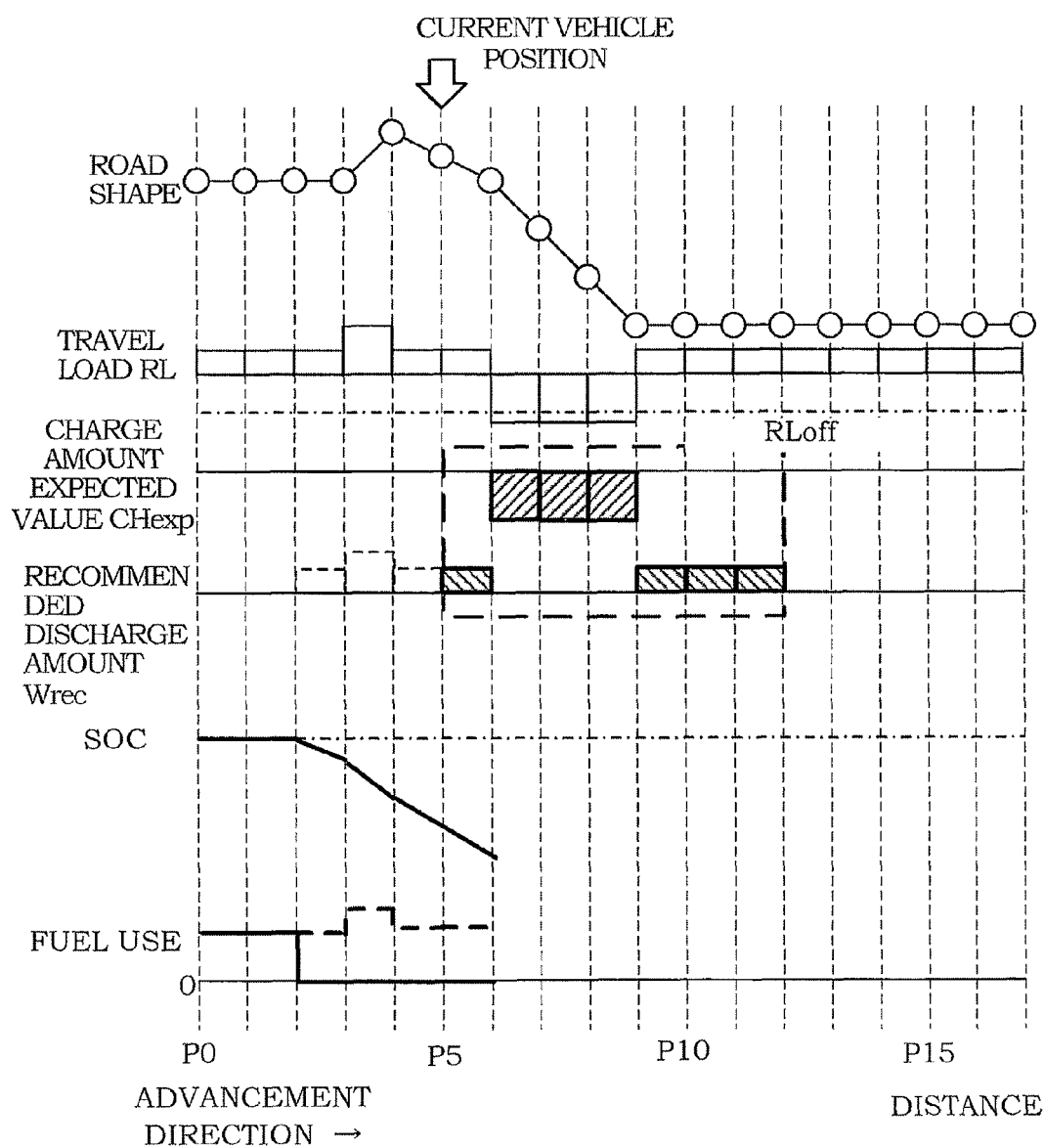
FIG. 14 is a fifth view showing in time series the operations performed when the calculations of FIGS. 3 to 8 are executed.

In FIG. 14, the current vehicle position advances one step from FIG. 13 to P5, and the travel load information search range extends from P5 to P12. The regeneration possible interval group extends from the second interval to the fourth interval, and the recommended discharge amount is first allocated to the first to third intervals. As a result, similarly to FIG. 13, the SOC decreases and the fuel injection amount reaches zero in the first interval. Furthermore, after the recommended discharge amount is allocated, a part of the charge amount expected value remains, and therefore the recommended discharge amount is also set in the fifth to seventh intervals.

Figure 15:
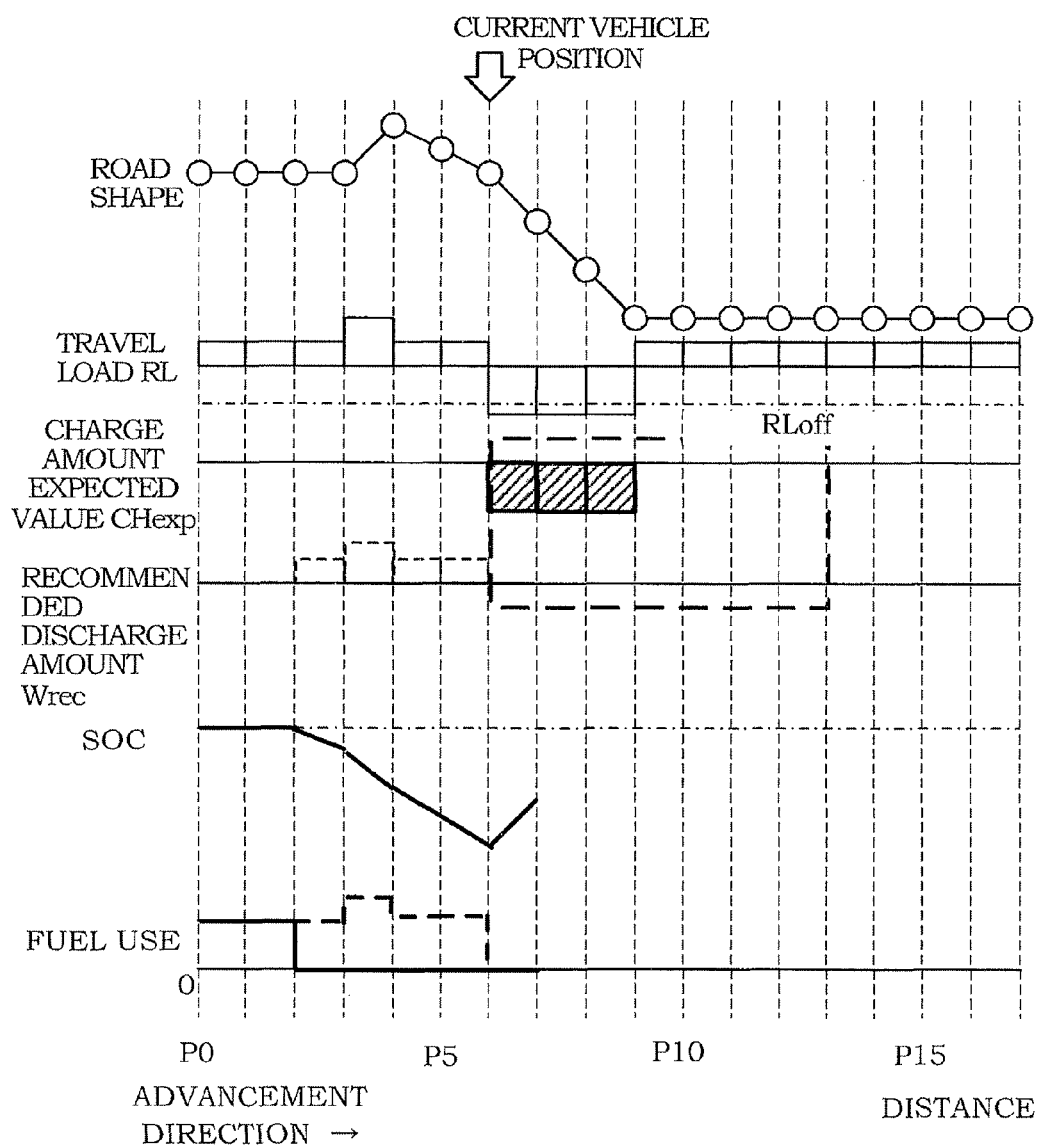
FIG. 15 is a sixth view showing in time series the operations performed when the calculations of FIGS. 3 to 8 are executed.

In FIG. 15, the current vehicle position advances one step from FIG. 14 to P6, and the travel load information search range extends from P6 to P13. The regeneration possible interval group extends from the first interval to the third interval. Since the first interval is a regeneration possible interval, discharge amount setting is not performed. In the first interval, the travel load is smaller than the accelerator OFF expected load, or in other words the driver switches the accelerator pedal OFF, and therefore regenerative charging is performed such that the SOC increases and the fuel injection amount reaches zero.

Figure 16:
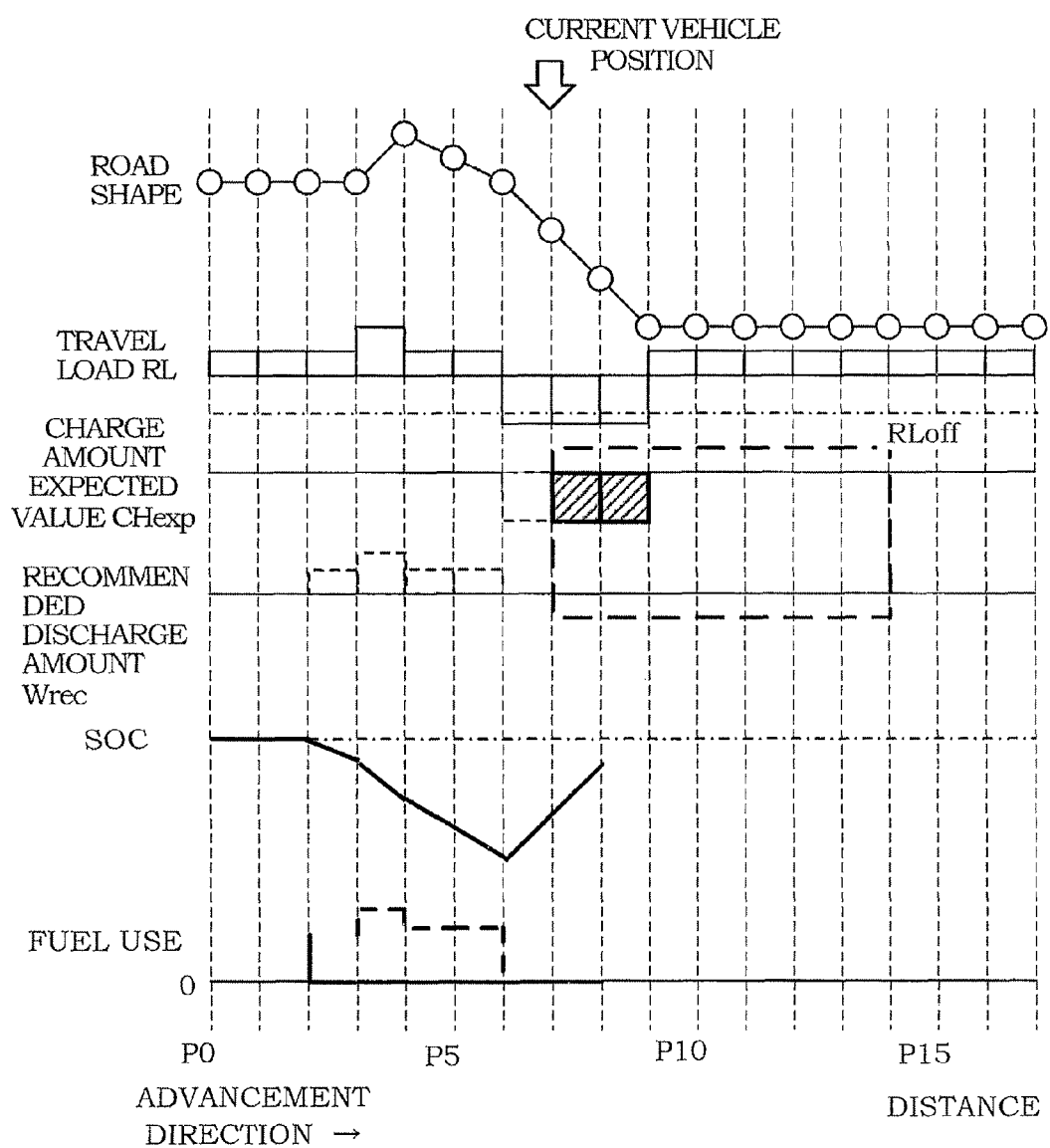
FIG. 16 is a seventh view showing in time series the operations performed when the calculations of FIGS. 3 to 8 are executed.

In FIG. 16, the current vehicle position advances one step from FIG. 15 to P7, and the travel load information search range extends from P7 to P14. The regeneration possible interval group includes the first interval and the second interval. Similarly to FIG. 15, the first interval is a regeneration possible interval, and therefore discharge amount setting is not performed. Instead, regenerative charging is performed such that the SOC increases further and the fuel injection amount remains at zero.

Figure 17:
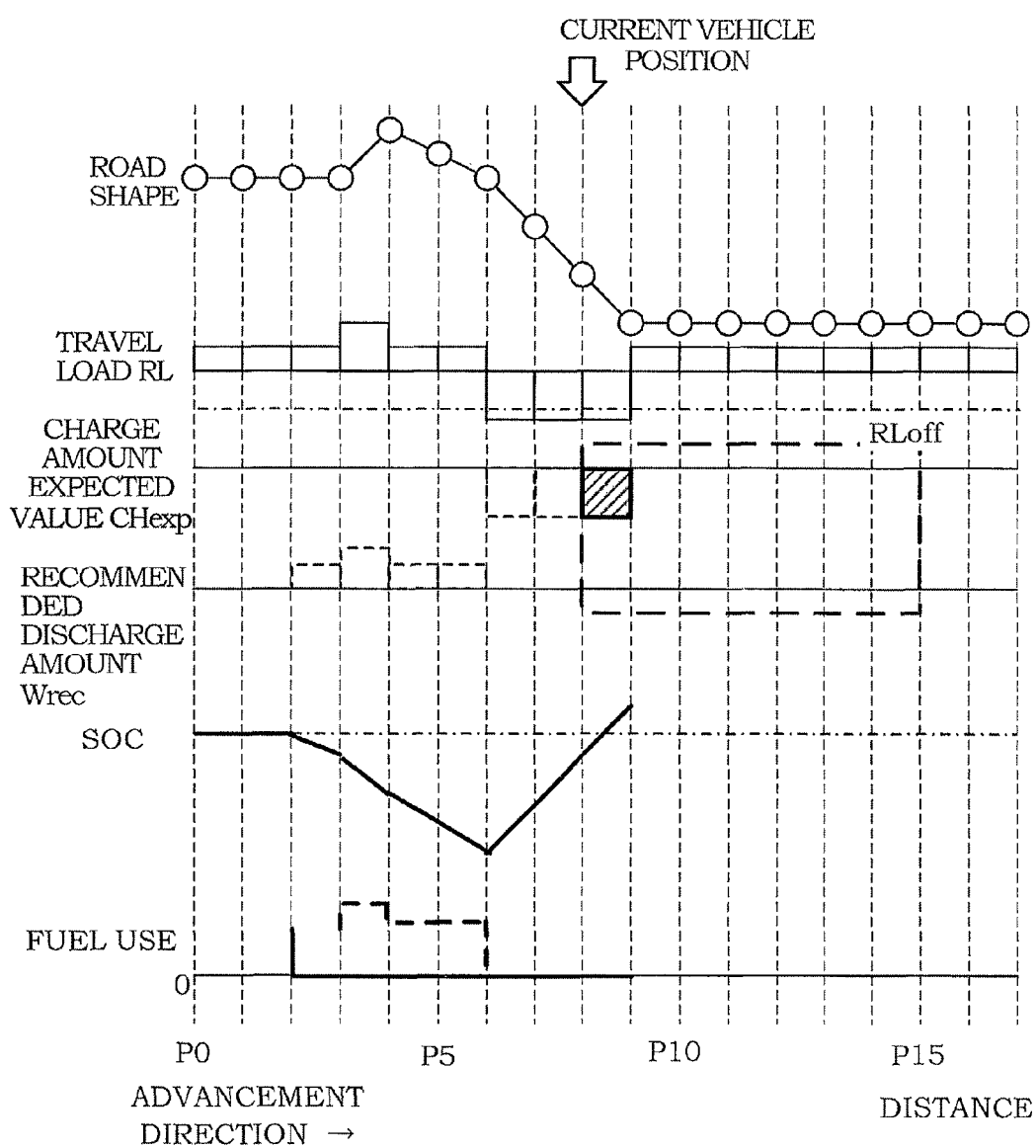
FIG. 17 is an eighth view showing in time series the operations performed when the calculations of FIGS. 3 to 8 are executed.

In FIG. 17, the current vehicle position advances one step from FIG. 16 to P8, and the travel load information search range extends from P8 to P15. The regeneration possible interval group includes the first interval only. Here also, similarly to FIG. 15, the SOC increases while the fuel injection amount remains at zero. It should be noted that the SOC rises above the reference value midway through the interval.

Figure 18:
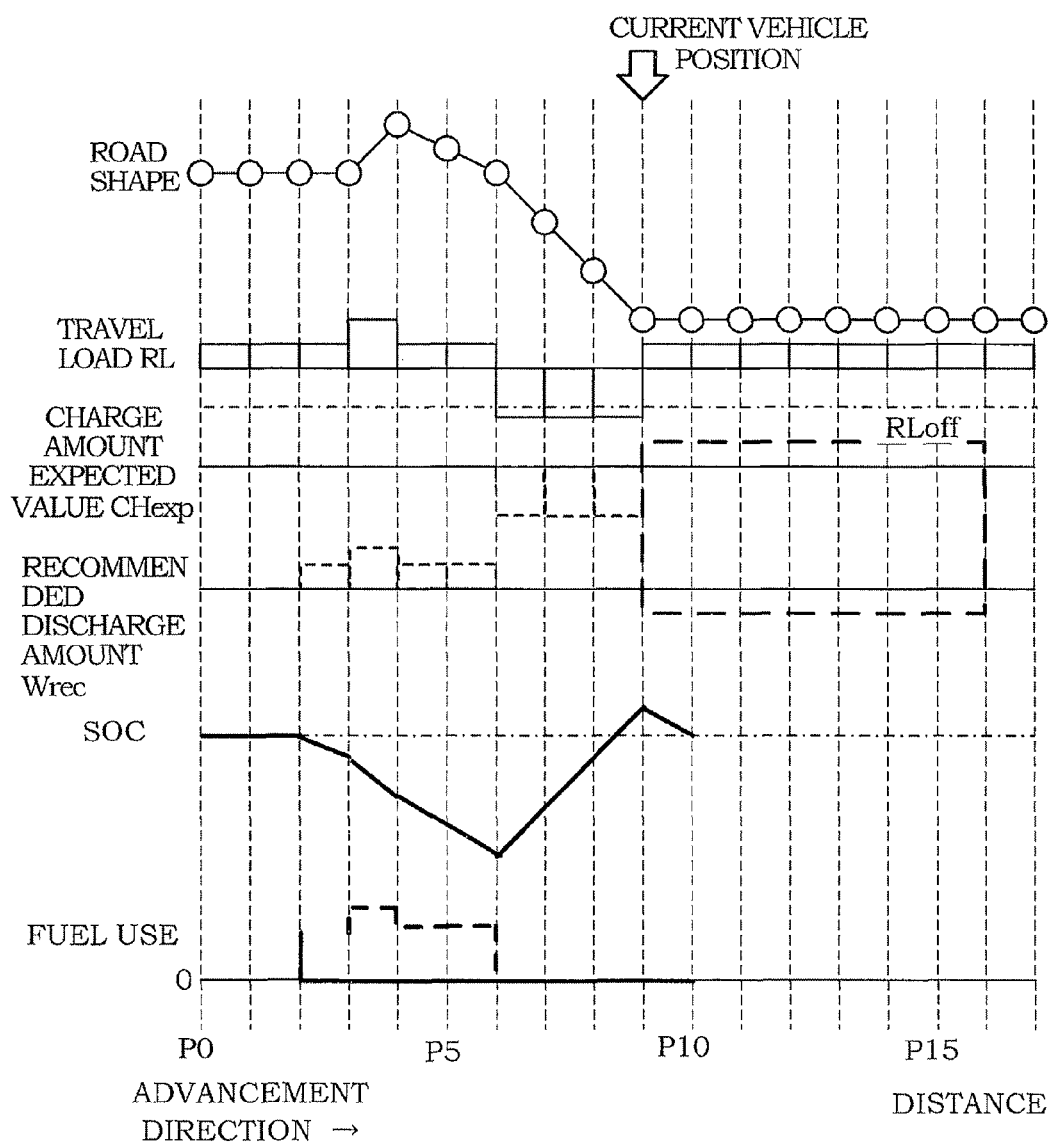
FIG. 18 is a ninth view showing in time series the operations performed when the calculations of FIGS. 3 to 8 are executed.

In FIG. 18, the current vehicle position advances one step from FIG. 17 to P9, and the travel load information search range extends from P9 to P16. A regeneration possible interval group does not exist in the travel load information search range. However, the travel load exceeds the accelerator OFF expected load, and therefore the driver depresses the accelerator pedal. Further, the SOC exceeds the reference value. Hence, the integrated controller 51 executes discharge control to return the SOC to the reference value. As a result, travel is performed using the motor/generator 2 even though the driver is depressing the accelerator pedal, and accordingly the fuel injection amount remains at zero.

Figure 19:
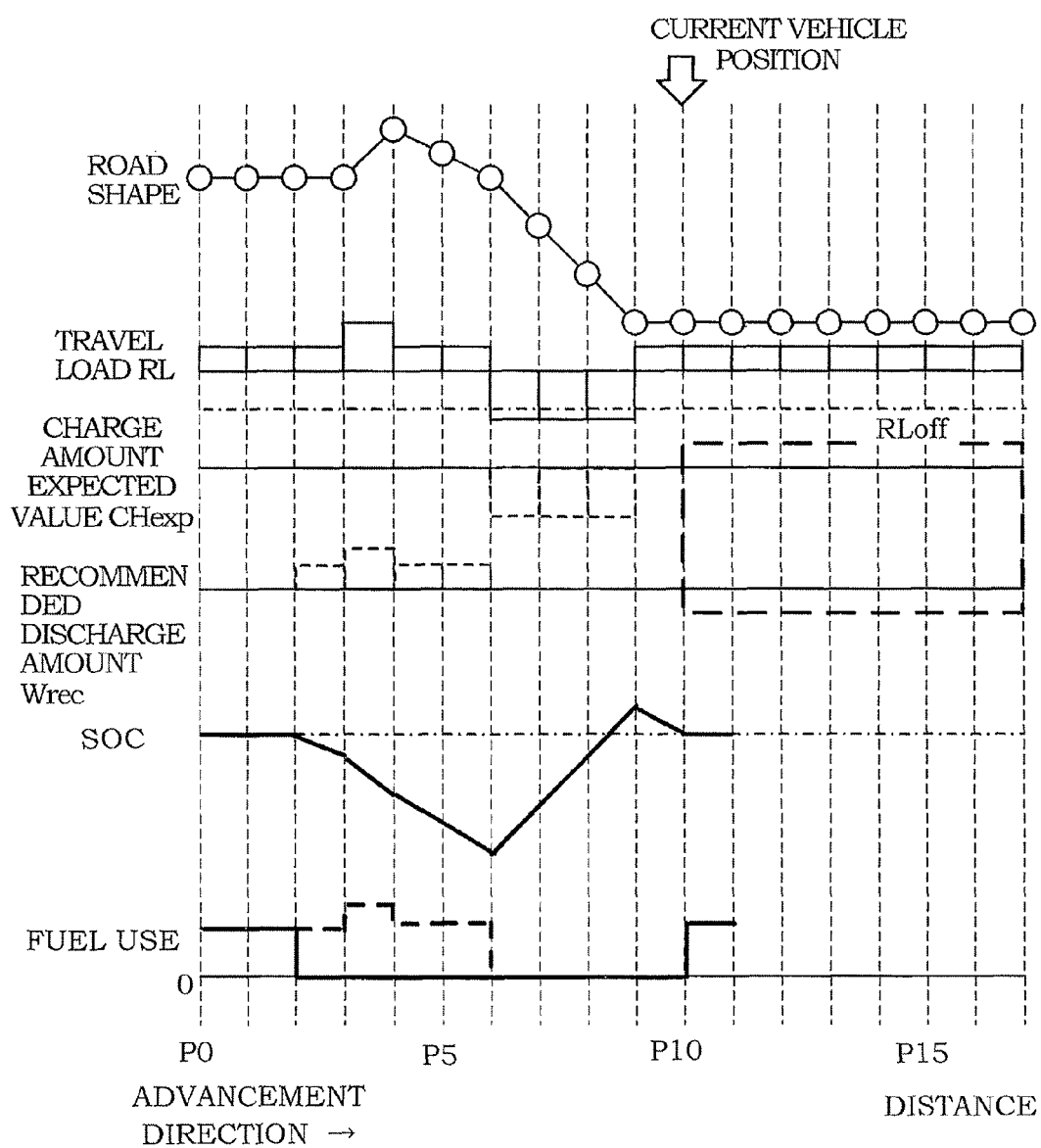
FIG. 19 is a tenth view showing in time series the operations performed when the calculations of FIGS. 3 to 8 are executed.

In FIG. 19, the current vehicle position advances one step from FIG. 18 to P10, and the travel load information search range extends from P10 to P17. A regeneration possible interval group does not exist in the travel load information search range. Further, the SOC has returned to the reference value. In other words, the travel condition has returned to the condition shown in FIG. 9 such that the fuel injection amount corresponds to the travel load.

As described above, from P0 to P11, only three intervals from P6 to P10 serve as regeneration possible intervals, but by allocating the recommended discharge amount based on the charge amount expected value in the corresponding interval preferentially to the adjacent interval, the fuel injection amount is held at zero over a continuous interval extending from P2 to P10.

According to this embodiment, as described above, a predicted route from the current position to a predetermined distance ahead is divided into a plurality of intervals, the travel load of each interval is estimated, a regeneration possible interval is searched for from the estimation result, and the charge amount expected value in the regeneration possible interval is estimated. The charge amount expected value is then distributed preferentially to an adjacent interval to the regeneration possible interval as a recommended discharge amount such that the output of the internal combustion engine 1 is stopped or the output of the internal combustion engine 1 becomes smaller than an output corresponding to the estimated travel load. An operation of the motor/generator 2 in the current interval is then controlled on the basis of a post-distribution condition. In so doing, a travel schedule in which travel is performed by the motor/generator 2 over a longer interval is planned around the regeneration possible interval, and as a result, the switching frequency between stopping and starting the internal combustion engine 1 is reduced.

Further, a measurement point for obtaining information indicating the road surface gradient, the altitude, and the distance to the adjacent interval is set in each interval, and the calculations for distributing the recommended discharge amount, described above, are executed every time the current position reaches the measurement point in each interval. By limiting the intervals in this manner, the calculations can be simplified.

Furthermore, the travel load calculation unit 200 reads topographic information and position information relating to each interval and sets a target speed therein, and estimates the travel load on the basis thereof. As a result, the travel load can be estimated even when a destination has not been set on a navigation system.

Moreover, the recommended discharge amount calculation unit 300 distributes the charge amount expected value repeatedly in sequence until the output of the internal combustion engine 1 reaches zero in all intervals up to the predetermined distance ahead, or until the charge amount expected value reaches zero. As a result, travel can be performed using the motor/generator 2 over an even longer interval.

An embodiment of this invention was described above, but the above embodiment is merely an example of an application of this invention, and the technical scope of this invention is not limited to the specific configurations of the above embodiment.

This application claims priority from Japanese Patent Application No. 2012-60119, filed on Mar. 16, 2012 in the Japan Patent Office, the entire the entire disclosure of which is incorporated herein by reference.

What is claimed is:

1. A driving force control device for a hybrid vehicle that includes both an internal combustion engine and a motor/generator as drive sources, comprising:
    a travel load calculation unit adapted to divide a predicted route from a current position to a predetermined distance ahead into a plurality of intervals, and to estimate a travel load in each interval;
    a recommended discharge amount calculation unit adapted to search for a regeneration possible interval, in which a travel condition required by a driver can be maintained even when an output of the internal combustion engine is stopped and regeneration is performed by the motor/generator, from an estimation result obtained by the travel load calculation unit, and to estimate a charge amount expected value, which is an amount of energy that can be regenerated in the regeneration possible interval, and distributes the charge amount expected value preferentially to an adjacent interval to the regeneration possible interval as a recommended discharge amount in order to stop the output of the internal combustion engine; and
    an energy management unit adapted to control an operation of the motor/generator in the current position on the basis of a travel condition, a state of charge, and the recommended discharge amount in the current position.

2. The driving force control device for a hybrid vehicle as defined in claim 1, wherein a measurement point for obtaining information indicating a road surface gradient, an altitude, and a distance to the adjacent interval is set in each interval, and the calculations of the travel load calculation unit and the recommended discharge amount calculation unit are executed every time the current position reaches the measurement point in each interval.

3. The driving force control device for a hybrid vehicle as defined in claim 1, wherein the travel load calculation unit reads topographic information and position information relating to each interval and sets a target speed therein, and estimates the travel load on the basis thereof.

4. The driving force control device for a hybrid vehicle as defined in claim 1, wherein the recommended discharge amount calculation unit distributes the charge amount expected value repeatedly in sequence until the output of the internal combustion engine reaches zero in all intervals up to the predetermined distance ahead, or until the charge amount expected value reaches zero.

5. A driving force control method for a hybrid vehicle that includes both an internal combustion engine and a motor/generator as drive sources, comprising:
    dividing a predicted route from a current position to a predetermined distance ahead into a plurality of intervals, and estimating a travel load in each interval;
    searching for a regeneration possible interval, in which a travel condition required by a driver can be maintained even when an output of the internal combustion engine is stopped and regeneration is performed by the motor/generator, from an estimation result of the travel load, estimating a charge amount expected value, which is an amount of energy that can be regenerated in the regeneration possible interval, and distributing the charge amount expected value preferentially to an adjacent interval to the regeneration possible interval as a recommended discharge amount in order to stop the output of the internal combustion engine; and
    controlling an operation of the motor/generator in the current position on the basis of a travel condition, a state of charge, and the recommended discharge amount in the current position.

* * * * *